US011263052B2

(12) United States Patent
Saxena et al.

(10) Patent No.: US 11,263,052 B2
(45) Date of Patent: Mar. 1, 2022

(54) DETERMINING OPTIMAL COMPUTE RESOURCES FOR DISTRIBUTED BATCH BASED OPTIMIZATION APPLICATIONS

(71) Applicant: International Business Machines Corporation, Armonk, NY (US)

(72) Inventors: Vaibhav Saxena, New Delhi (IN); Saurav Basu, New Delhi (IN); Jayaram Kallapalayam Radhakrishnan, Yorktown Heights, NY (US); Yogish Sabharwal, Gurgaon (IN); Ashish Verma, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 16/524,550

(22) Filed: Jul. 29, 2019

(65) Prior Publication Data

US 2021/0034374 A1 Feb. 4, 2021

(51) Int. Cl.
*G06F 9/50* (2006.01)
*G06F 9/38* (2018.01)
(Continued)

(52) U.S. Cl.
CPC .......... *G06F 9/5027* (2013.01); *G06F 9/3891* (2013.01); *G06F 9/4881* (2013.01);
(Continued)

(58) Field of Classification Search
None
See application file for complete search history.

(56) References Cited

U.S. PATENT DOCUMENTS 10,452,441 B1* 10/2019 Subramanian ... G06Q 10/06313
10,509,683 B2* 12/2019 Furman ................. G06F 9/5061
(Continued)

FOREIGN PATENT DOCUMENTS

WO 2017172206 10/2017

OTHER PUBLICATIONS

Muttoni et al.; "Optimal Number of nodes for computation in grid environments", IEEE 2004; (Muttoni_2004.pdf, pp. 1-8) (Year: 2004).*

(Continued)

*Primary Examiner* — Hiren P Patel
(74) *Attorney, Agent, or Firm* — Ryan. Mason & Lewis, LLP (57) ABSTRACT

Methods, systems, and computer program products for determining optimal compute resources for distributed batch based optimization applications are provided herein. A method includes obtaining a size of an input dataset, a size of a model, and a set of batch sizes corresponding to a job to be processed using a distributed computing system; computing, based at least in part on the set of batch sizes, one or more node counts corresponding to a number of nodes that can be used for processing said job; estimating, for each given one of the node counts, an execution time to process the job based on an average computation time for a batch of said input dataset and an average communication time for said batch of said input dataset; and selecting, based at least in part on said estimating, at least one of said node counts for processing the job.

20 Claims, 6 Drawing Sheets

(51) Int. Cl.
  *G06F 9/48* (2006.01)
  *G06F 9/54* (2006.01)
  *G06Q 30/02* (2012.01)
  *G06K 9/62* (2022.01)
  *G06N 3/08* (2006.01)

(52) U.S. Cl.
  CPC .............. *G06F 9/50* (2013.01); *G06F 9/5061* (2013.01); *G06F 9/5077* (2013.01); *G06F 9/544* (2013.01); *G06K 9/6257* (2013.01); *G06Q 30/0206* (2013.01); *G06F 9/5011* (2013.01); *G06F 9/5072* (2013.01); *G06N 3/08* (2013.01)

(56) References Cited

U.S. PATENT DOCUMENTS

| | | | | |
|---|---|---|---|---|
| 2010/0131949 | A1* | 5/2010 | Ferris | G06F 9/5027 718/1 |
| 2011/0191774 | A1* | 8/2011 | Hsu | G06F 9/46 718/100 |
| 2012/0198466 | A1* | 8/2012 | Cherkasova | G06F 9/5066 718/104 |
| 2013/0152089 | A1* | 6/2013 | Shimamura | G06F 15/17381 718/100 |
| 2013/0212277 | A1* | 8/2013 | Bodik | G06F 9/4887 709/226 |
| 2014/0019987 | A1* | 1/2014 | Verma | G06F 9/4887 718/103 |
| 2014/0089727 | A1* | 3/2014 | Cherkasova | G06F 11/3404 714/6.13 |
| 2016/0212007 | A1* | 7/2016 | Alatorre | H04L 41/04 |
| 2017/0068888 | A1 | 3/2017 | Chung et al. | |
| 2017/0161105 | A1* | 6/2017 | Barrett | G06F 11/3419 |
| 2017/0200113 | A1* | 7/2017 | Cherkasova | G06F 9/5072 |
| 2017/0220949 | A1 | 8/2017 | Feng et al. | |
| 2017/0286861 | A1* | 10/2017 | Kelly | G06N 3/063 |
| 2018/0113742 | A1* | 4/2018 | Chung | G06F 9/5005 |
| 2018/0300653 | A1* | 10/2018 | Srinivasan | H04L 67/06 |
| 2019/0114078 | A1* | 4/2019 | Oh | G06F 3/0634 |
| 2019/0171494 | A1* | 6/2019 | Nucci | G06N 5/003 |
| 2019/0306044 | A1* | 10/2019 | Cohen | H04L 67/22 |
| 2020/0026577 | A1* | 1/2020 | Dias | G06F 8/75 |
| 2020/0159589 | A1* | 5/2020 | Capes | G06K 9/00993 |
| 2020/0174840 | A1* | 6/2020 | Zhao | G06N 3/084 |
| 2021/0012228 | A1* | 1/2021 | Yaguchi | G06F 11/3466 |
| 2021/0019151 | A1* | 1/2021 | Pudipeddi | G06N 3/063 |

OTHER PUBLICATIONS

Sidhanta et al.; "OptEx: A Deadline-Aware Cost Optimization Model for Spark", IEEE 2016; (Sidhanta_2016.pdf, pp. 1-10) (Year: 2016).*
Raveendran et al., A Framework for Elastic Execution of Existing MPI Programs, 2011 IEEE International Symposium on Parallel and Distributed Processing Workshops and Phd Forum, Shanghai, 2011, pp. 940-947.
Huang et al., CAP3: A cloud auto-provisioning framework for parallel processing using on-demand and spot instances, 2013 IEEE Sixth International Conference on Cloud Computing, IEEE, 2013, pp. 228-235.
Sun et al., Slim-DP: A Multi-Agent System for Communication-Efficient Distributed Deep Learning, Proceedings of the 17th International Conference on Autonomous Agents and MultiAgent Systems, Jul. 2018, International Foundation for Autonomous Agents and Multiagent Systems, pp. 721-729.
Ragab et al., Scalable multi-node deep learning training using GPUs in the AWS Cloud, AWS Machine Learning Blog retreived from https://aws.amazon.com/blogs/machine-learning/scalable-multi-node-deep-learning-training-using-gpus-in-the-aws-cloud/, Jul. 20, 2018.
Resource Estimator Service, retrieved from https://hadoop.apache.org/docs/current/hadoop-resourceestimator/ResourceEstimator.html, Nov. 13, 2018, The Apache Software Foundation.
Pastorelli et al., Practical size-based scheduling for MapReduce workloads, arXiv preprint arXiv: 1302.2749. Feb. 12, 2013.
Verma et al., Resource provisioning framework for mapreduce jobs with performance goals, ACM/IFIP/USENIX International Conference on Distributed Systems Platforms and Open Distributed Processing, Dec. 2011, pp. 165-186, Springer, Berlin, Heidelberg.

* cited by examiner

FIG. 6

DETERMINING OPTIMAL COMPUTE RESOURCES FOR DISTRIBUTED BATCH BASED OPTIMIZATION APPLICATIONS

FIELD

The present application generally relates to information technology and, more particularly, to determining optimal compute resources.

BACKGROUND

Many optimization applications such as those based on Stochastic Gradient Descent (SGD), work iteratively on batches of input data to learn a model that minimizes (or maximizes) an objective function. It is common for batch based optimization applications (such as Deep Learning (DL) jobs) to take days or even weeks for training on datasets. Training time increases as datasets grow larger and models become deeper and more complex. DL jobs, for example, are increasingly being run on DL clouds that are customized for this purpose. Currently, users predetermine the number of computing units (GPUs/nodes) and are charged based on a per hour per compute unit cost.

SUMMARY

In one embodiment of the present invention, techniques for determining optimal compute resources for distributed batch based optimization applications are provided. An exemplary computer-implemented method includes obtaining (i) a size of a model and (ii) a set of batch sizes for an input dataset corresponding to a job to be processed using a distributed computing system, wherein said distributed computing system comprises a plurality of nodes; computing, based at least in part on the set of batch sizes, one or more node counts corresponding to the number of nodes that can be used for processing said job; estimating, for each given one of said node counts, an execution time to process the job using the number of nodes corresponding to the given node count, wherein said estimating comprises determining (i) an average computation time for a batch of said input dataset and (ii) an average communication time for a batch of said input dataset, wherein the average communication time is based at least in part on the size of the model and the number of nodes corresponding to the given node count; and selecting, based at least in part on said estimating, at least one of said node counts for processing the job.

Another exemplary computer-implemented method includes determining a plurality of computing resource configurations of a distributed computing system for processing a batch based job based at least in part on (i) a size of a model and (ii) a set of batch sizes; determining, for each given one of said computing resource configurations, (i) an average computation time to process a batch of said input dataset using the given computing resource configuration and (ii) an average communication time for said batch of said input dataset; and selecting the optimal computing resource configuration for processing the batch based job from among the plurality of computing resource configurations, based at least in part on (i) the average computation time and (ii) the average communication times determined for each of the computing resource configurations.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Runtime performance and/or scalability of distributed batch based optimization jobs is limited by slow communications networks and often does not account for the fact that communication throughput may vary across nodes or time such as, for example, in cloud computing environments. Training time for deep learning applications, for example, either does not reduce, or only reduces a minimal amount, when additional computing nodes are used having a slow interconnection network. Such issues also reduce the cost effectiveness as spending more money for additional computing nodes does not provide a proportional benefit.

Example embodiments of the subject matter described herein provide techniques that improve the efficiency (e.g., monetary cost and/or compute efficiency) when running distributed batch based optimization applications. For example, at least one example embodiment recognizes that jobs can be run in a large batch simulation mode instead of using additional resources/nodes to reduce communication time. Large batch simulation mode generally refers to running a job wherein a fewer number of nodes process more units of work (also referred to as batches). By way of example, if a job uses ten nodes and each node processes one unit of work, then processing the same job using a large batch simulation mode may use only five nodes to process the same ten units of work (i.e., each node processes two units of work). In this case, each node is performing twice the computation, but the data communication happens only across five nodes instead of ten nodes. If N nodes require time T for completing the job, then the total time taken across all nodes is N×T. Running the job using 2N nodes may take significantly more time than T/2 on slow networks and hence the total time taken across all nodes (which is proportional to the cost) may be significantly more than N×T. Therefore, from a cost efficiency standpoint, it may better to run the job with fewer (N) nodes with a large batch simulation mode rather than running it with more (2N) nodes. Using a large batch simulation mode can be useful when communication between nodes is slow because data need to be communicated between fewer nodes.

As such, one example embodiment includes techniques for determining optimal computing resources for a distributed batch based optimization job based on the compute time, communication overhead, and input constraints from the user with respect to limits on job execution time and cost. As used herein, computation time refers to the time taken for processing something (such as a batch of data, for example) on a single node, and communication time refers to the time taken for communicating (or exchanging, transferring, etc.) data across different nodes.

Figure 1:
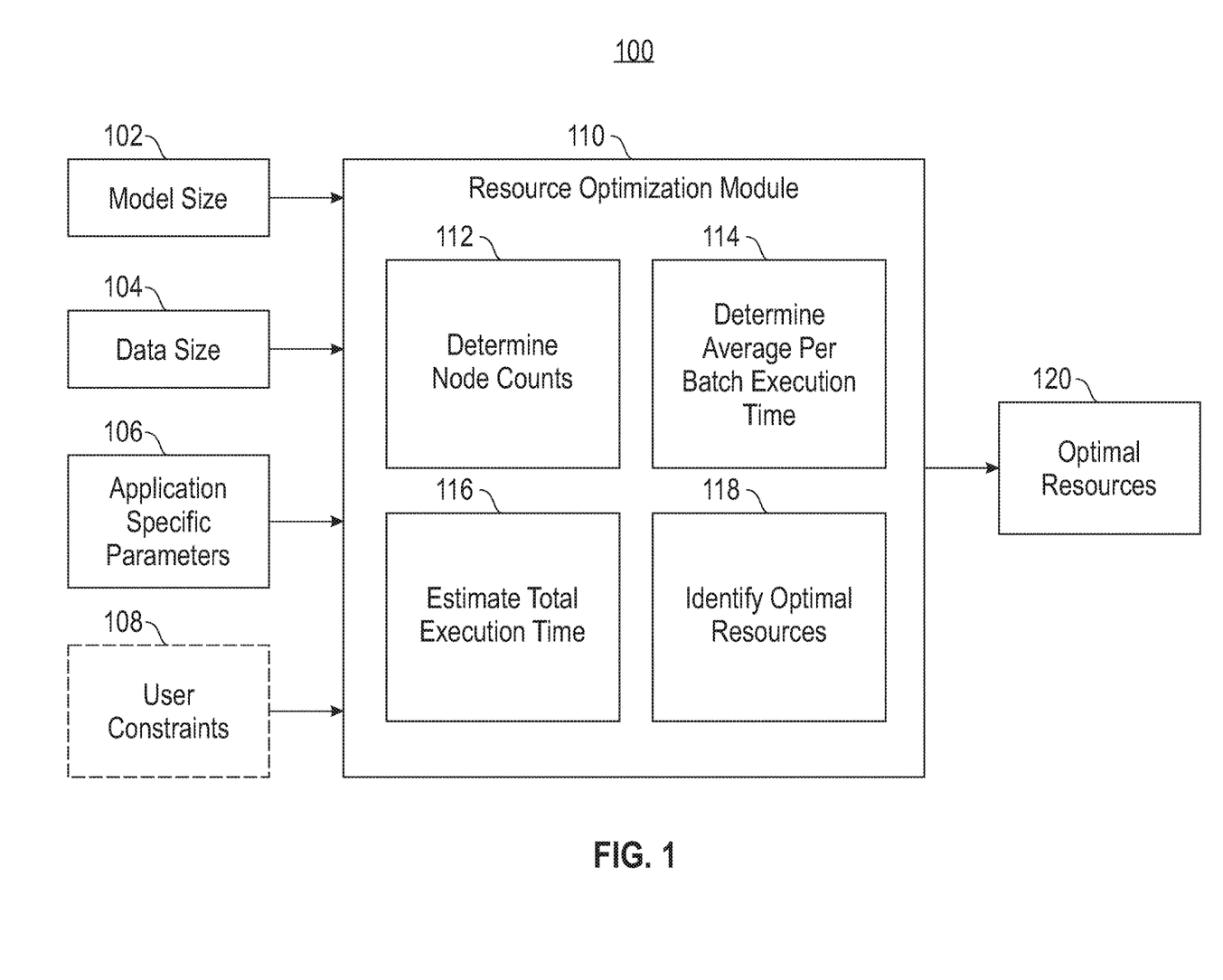
FIG. 1 is a diagram illustrating a system architecture, according to an exemplary embodiment of the invention.

FIG. 1 is a simplified block diagram illustrating a system architecture 100, according to an embodiment of the invention. By way of illustration, FIG. 1 includes a resource optimization module 110 that obtains a model size 102, data size 104, application specific parameters 106, and, optionally, user constraints 108. The user constraints 108 may include a cost to execute a particular job and/or a job execution time. As an example, the data may correspond to a set of training images for a deep learning job, and the data size 104 may correspond to the number of training images. The application specific parameters 106 may include batch sizes in the form of, for example, a range (e.g., $BS_{min}$, $BS_{max}$), a set of batch sizes (e.g., an array), etc. According to at least some example embodiments, the application specific parameters 106 may also include a batch size per node.

The resource optimization module 110 determines node counts as indicated by block 112, wherein each node count corresponds to a possible number of nodes that can be used to process a particular job. For example, determining the node counts may include determining the minimum number of nodes that can be used ($N_{min}$) and determining the maximum number of nodes that can be used ($N_{max}$). The resource optimization module 110 then determines the average per batch compute time on a single node as indicated by 114. The average per batch compute time may be determined, for example, by running one or more batches of input data on one of the nodes.

The resource optimization module 110 estimates the total execution time for each of the node counts as indicated by 116. In some examples, estimating the total execution time may include determining a communication time per batch of data based on the model size 102 and a given one of the node counts.

The resource optimization module 110 then identifies and outputs optimal resources 120 as indicated by 118. The optimal resources 120 may indicate one or more recommended node counts that best satisfy the user constraints 108. If user constraints 108 are not provided, then the optimal resources 120 may include information (e.g., tables and/or charts) indicating the job execution time and cost associated with varying numbers of nodes. The user may then interact (via a graphical user interface, for example) to provide feedback and/or select the number of nodes to use to process the job based on this information.

As such, one or more example embodiments of the subject matter described herein provide techniques for modeling a runtime of an optimization job in terms of compute time, communication time, and batch simulation factor to determine the execution time and cost for a different number of nodes. Information related to the costs and/or runtimes may be used to automatically select (e.g., without user input) a number of nodes to be used for processing the job, or the information may be output to a user to assist the user in selecting a number of nodes. Generally, the user cost (C) is proportional to the runtime of the job (T) and number of nodes/compute units used (N), namely, $C\alpha T*N$ (it is noted that the cost may not be a linear function of number of nodes).

By way of example, given an input data size (TI), a model size (M), and a batch size per node (BSPN), the time per epoch for a given node count corresponding to a number of nodes (N) may be calculated as: T(per epoch)=TI/(BSPN*N)*[compute time per batch+1/SF*AR(M, N)], wherein AR is Allreduce time (AR time) (e.g., Message Passing Interface (MPI) Allreduce time) over N nodes using a buffer size of M, and SF is the maximum batch simulation factor for N nodes such that the resultant batch size (BS) <$BS_{max}$(e.g., SF=floor($N_{max}$/N)). The time per epoch can be calculated for N=$N_{min}$ to $N_{max}$, wherein $N_{min}$=BS/BSPN and $N_{max}$=$BS_{max}$/BSPN.

The total cost for each node count may then be determined as follows: Cost=Time*C(N)=TI/BSPN*C(N)/N*[compute time per batch+1/SF*AR(M, N)], wherein C(N) is the cost for using N nodes per unit of time. In some example embodiments, the 'compute time per batch' is measured by running the job on a subset of nodes (e.g., a single node) for a predetermined number of epochs or iterations and then taking an average.

The Allreduce (AR) time is measured periodically for a different number of nodes. As an example, a list of AR time (AR[M, N]) may be created by measuring the AR time for a buffer of size M for different number of nodes $N=2^i$, wherein i=0 to $i_{max}$. The AR time for a specific node count may then be calculated by interpolating the times of two nearest node counts. The AR time list may be updated periodically (such as by re-measuring the AR time every 4 hours, for example). It is noted that 'Allreduce' here refers to an aggregation function which aggregates data across multiple nodes in a multi-node (distributed) system, and that MPI is one of the libraries which provides an Allreduce function for such aggregation. MPI Allreduce is merely an example of such a function, and those skilled in the art will appreciate that other functions may also be used (such as, for example, Allreduce functions provided by other libraries).

Figure 2:
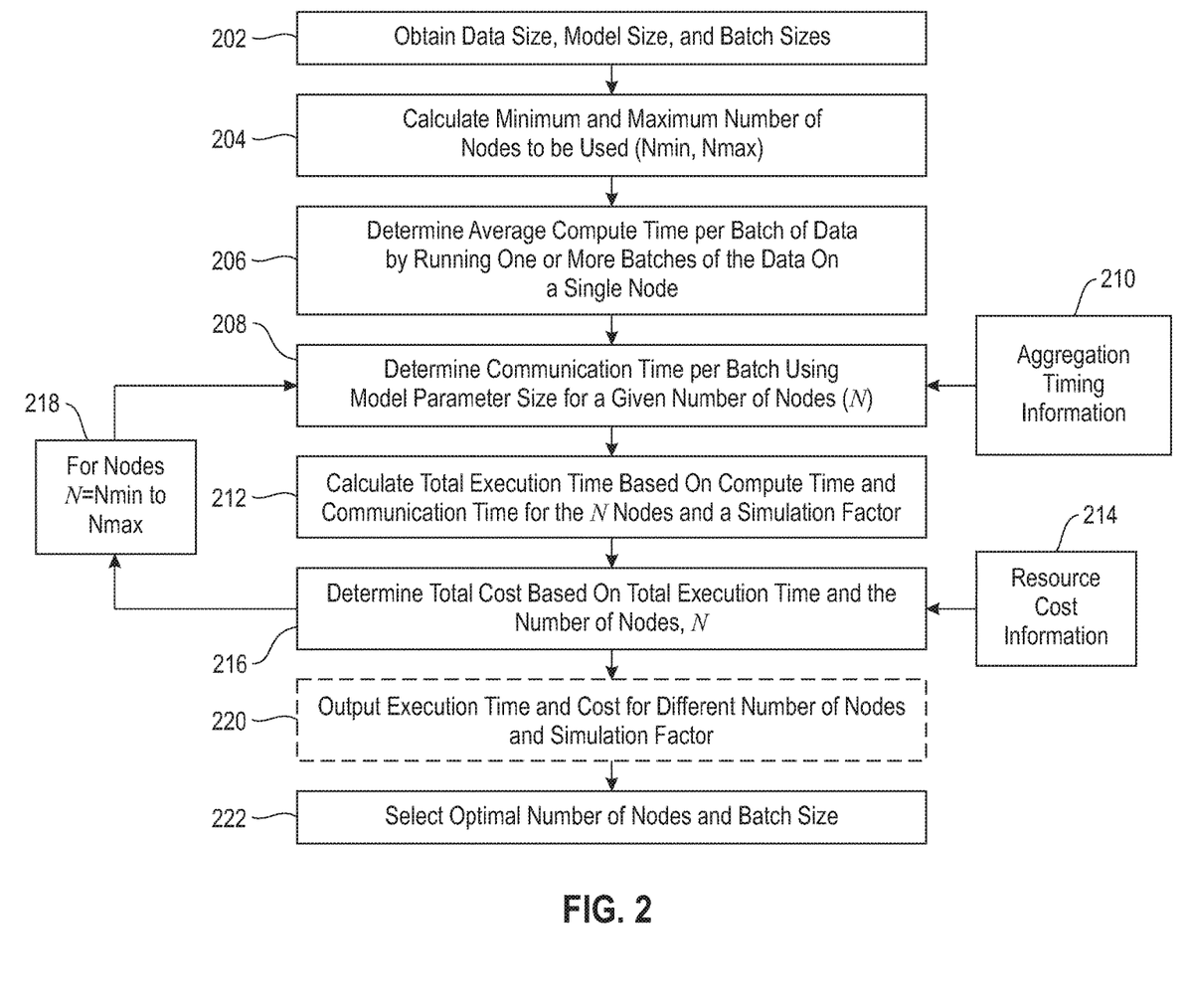
FIG. 2 is a flow diagram illustrating techniques according to an exemplary embodiment of the invention.

FIG. 2 is a flow diagram of a process according to an exemplary embodiment of the invention. At step 202, a data size, a model size, and batch sizes are obtained. Step 204 includes calculating a minimum and a maximum number of nodes to be used ($N_{min}$, $N_{max}$). Step 206 includes determining the average compute time per batch of data by running one or more batches of the data on a single node. At step 208, the communication time per batch of data is determined using the model parameter size for a given number of nodes, N, wherein N is initially set to $N_{min}$. The communication time per batch of data is determined based on aggregation timing information 210 (which may be measured, for example, using the Allreduce time, for example). At step 212, the total execution time is calculated by adding the compute time and the communication time for the given number of N nodes and corresponding simulation factor. Step 216 includes determining the total cost based on the total execution time, the given number of nodes (i.e., N), and resource cost information 214. The resource cost information 214 may include a look up table providing price/time (e.g., price/hour) information for different compute configurations based on the type of nodes and the node count. For example, the look up table may provide information for determining the per hour cost to use four nodes, wherein each node contains two P100 graphical processing units (GPUs), for example. Steps 208 through 216 are then repeated for different number of nodes, namely, for N=$N_{min}$, $N_{max}$ (218).

Optionally, step 220 includes outputting the execution time and cost for a different number of nodes and simulation factors. Step 220 may be performed, for example, when no user constraints are provided. At step 222, the optimal number of nodes and batch size are selected. If user constraints are provided, then the optimal number of nodes may be automatically selected so as to satisfy the user constraints. For example, given user constraints for cost of execution (C) and/or execution time (T), the optimal number of nodes may be selected based on the following equation: Min (a×Execution Time+b×Execution Cost) such that Execution Cost<C and Execution Time<T, wherein a and b are scaling factors for time and cost, respectively. The optimal number of nodes may also be determined based on user feedback in response to outputting information about the execution time and cost for the different number of nodes.

Figure 3:
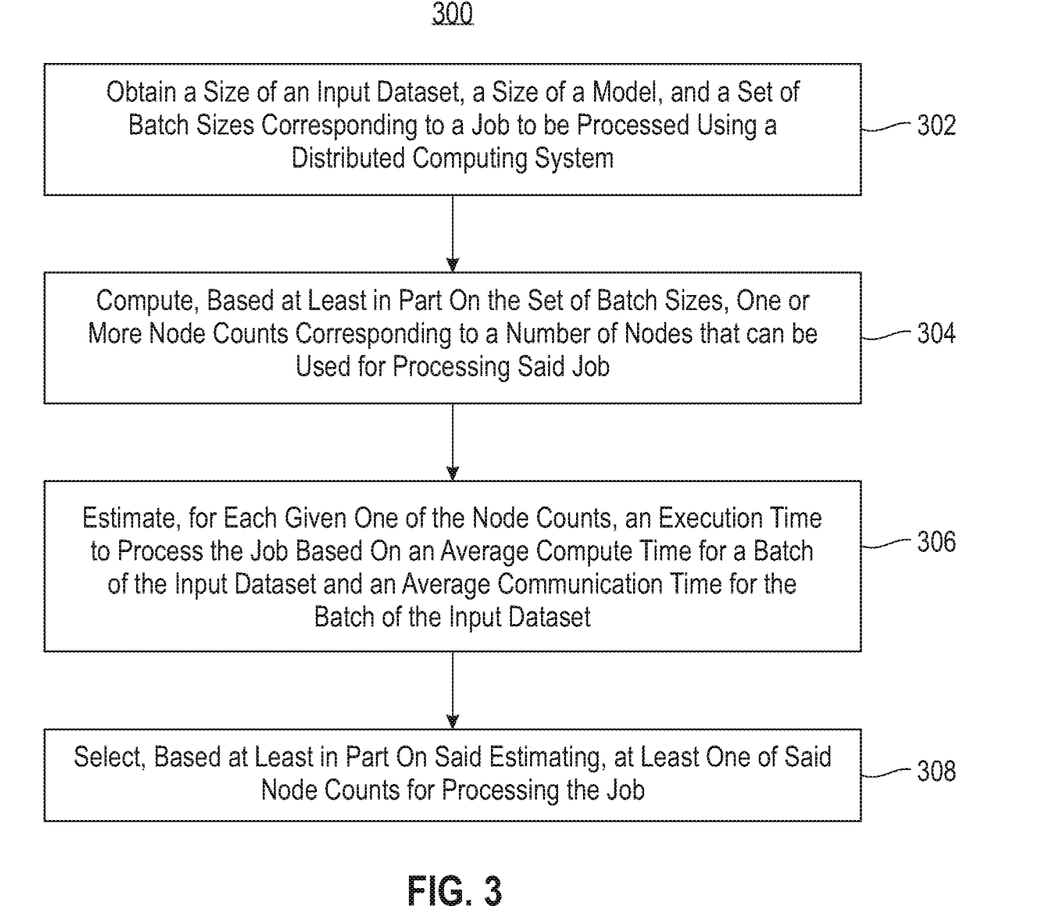
FIG. 3 is another flow diagram illustrating techniques according to an embodiment of the invention.

FIG. 3 is a flow diagram illustrating a process 300 according to an embodiment of the present invention. Step 302 of the process 300 includes obtaining (i) a size of a model and (ii) a set of batch sizes for an input dataset corresponding to a job to be processed using a distributed computing system, wherein said distributed computing system comprises a plurality of nodes. Step 304 includes computing, based at least in part on the set of batch sizes, one or more node counts corresponding to the number of nodes that can be used for processing said job. Step 306 includes estimating, for each given one of said node counts, an execution time to process the job using the number of nodes corresponding to the given node count, wherein said estimating comprises determining (i) an average computation time for a batch of said input dataset and (ii) an average communication time for said batch of said input dataset, wherein the average communication time is based at least in part on the size of the model and the number of nodes corresponding to the given node count. Step 308 includes selecting, based at least in part on said estimating, at least one of said node counts for processing the job.

The estimating at step 306 may include estimating a cost to process the job using the number of nodes corresponding to the given node count. Estimating the cost to process the job may be based at least in part on pricing information associated with using said nodes and estimated execution time.

The process 300 may include causing information to be output to a user interface, the information comprising the estimated execution time for each of the selected node counts, and in response to causing the information to be output, causing the job to be processed with one of the selected node counts based on user input received via the user interface.

The selecting at step 308 may be based at least in part on one or more constraints provided by a user, wherein said selecting is based at least in part on one or more constraints provided by a user, wherein said one or more constraints comprises at least one of (i) a cost constraint and (ii) a time constraint. The selecting may include selecting the optimal node count for the one or more user constraints. The process 300 may include causing the job to be processed with the optimal node count.

Determining the average computation time for a batch of the input data set may include determining an amount of time to process one or more batches of the input dataset using a single one of the nodes.

Determining the average communication time may include obtaining aggregation communication timing information for each of the node counts based on one or more communication timing measurements. Obtaining the aggregation communication timing information may include calling an Allreduce function on different numbers of nodes and a buffer size equal to the model size. Determining the average communication time may include interpolating the aggregation communication timing information for a first one of the node counts and a second one of the node counts to determine aggregation communication timing information for at least a third one of the node counts.

The job may include at least one of: a Deep Learning job (such, as training a neural network, for example); higher order Singular Value Decomposition (such as Tucker decomposition, for example); and a History Matching job in reservoir characterization.

The obtaining at step 302 may include obtaining a batch size per node, and the computing the one or more node counts may be based at least in part on said batch size per node.

According to another embodiment, a computer implemented method includes determining a plurality of computing resource configurations of a distributed computing system for processing a batch based job based at least in part on (i) a size of a model and (ii) a set of batch sizes; determining, for each given one of said computing resource configurations, (i) an average computation time to process a batch of said input dataset using the given computing resource configuration and (ii) an average communication time for said batch of said input dataset; and selecting the optimal computing resource configuration for processing the batch based job from among the plurality of computing resource configurations, based at least in part on (i) the average computation time and (ii) the average communication time determined for each of the computing resource configurations. The method may include obtaining at least one user constraint corresponding to one or more of (i) a total time to process the batch based job and (ii) a total cost to process the batch based job, and wherein the selecting may include selecting the optimal resource configuration that satisfies the at least one user constraint. The method may include outputting information to a user indicating one or more of: (i) a total time to process the batched based job using each of the plurality of computing resource configurations, and (ii) a total cost to process the based batch based job using each of the plurality of computing resource configurations, and wherein the selecting may include selecting the optimal resource configuration based on user input obtained in response to said outputting. The total time and/or the total cost for each of the given computing resource configurations may be based on the corresponding average computation time and the corresponding average communication time.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor.

The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
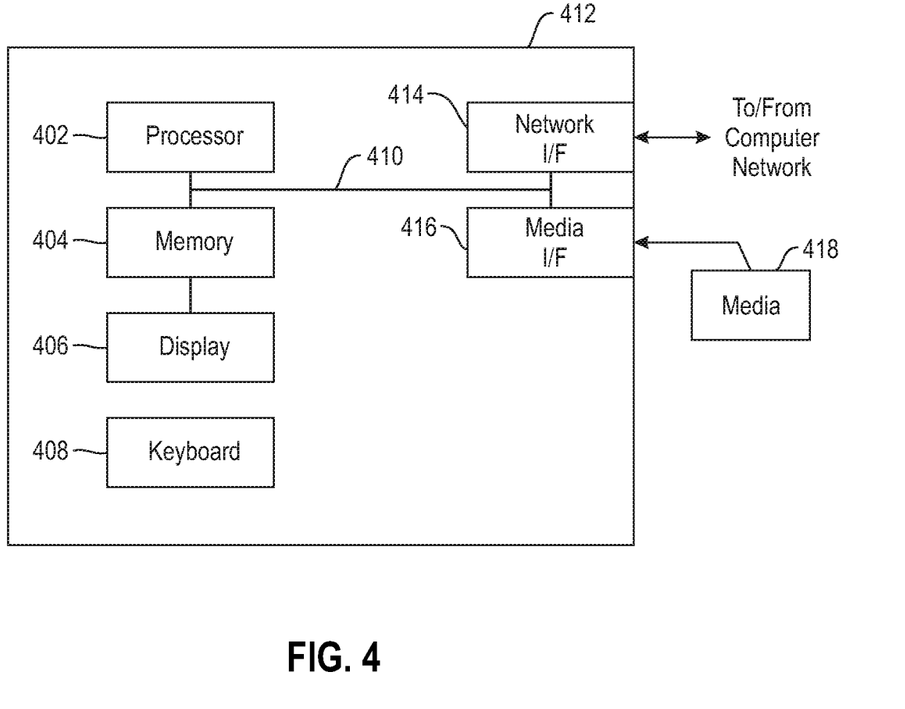
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418. In at least one example embodiment, the data processing system 412 represents a single node in a distributed computing system, wherein the distributed computing system include a plurality of such nodes interconnected through a computer network via Network I/F 414, for example.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
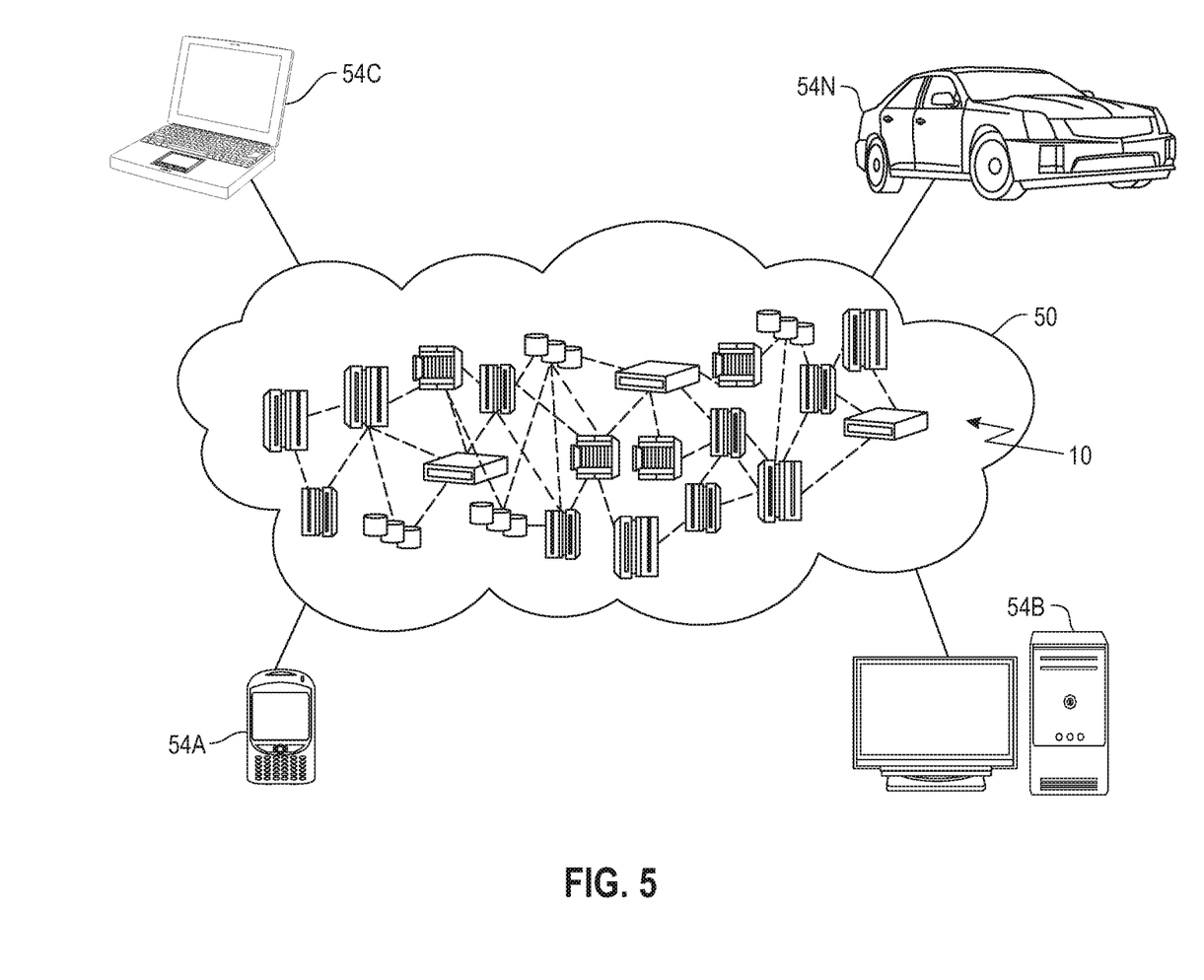
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
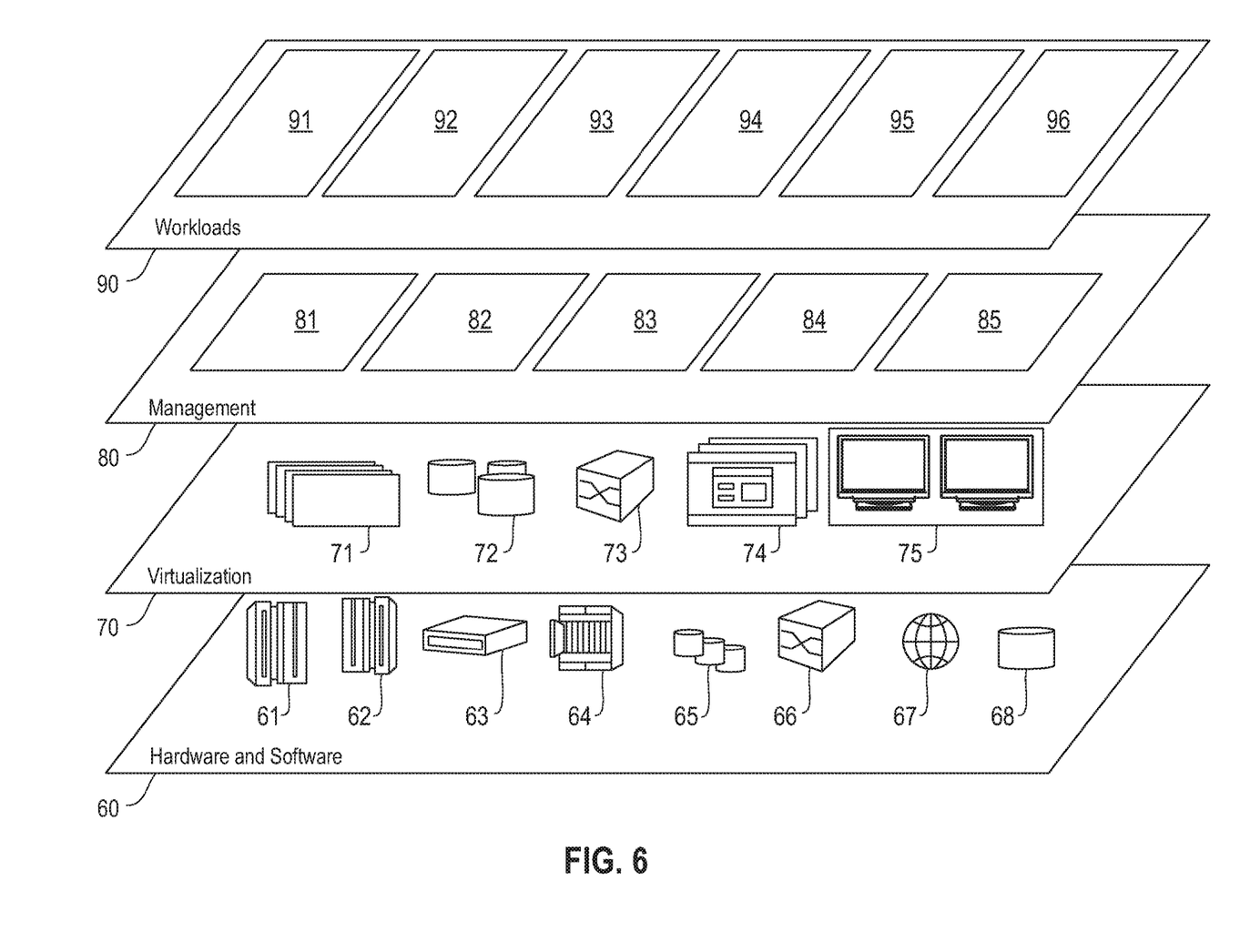
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining optimal compute resources for distributed batch based optimization applications 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide one or more beneficial effects, such as, for example: optimizing computing resources in a distributed computing system, reducing execution time for processing distributed batch based optimization jobs (such as DL jobs, for example), reducing costs associated with processing distributed batch based optimization jobs, and/or assisting Deep Learning as a Service (DLaaS) users in running distributed jobs in an efficient and timely manner.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining (i) a size of a model and (ii) a set of batch sizes for an input dataset corresponding to a job to be processed using a distributed computing system, wherein said distributed computing system comprises a plurality of nodes;
   computing, based at least in part on the set of batch sizes, a plurality of node counts, each node count corresponding to a number of nodes that can be used for processing said job;
   estimating, for each given one of said node counts, an execution time to process the job using the number of nodes corresponding to the given node count, wherein said estimating comprises determining (i) an average computation time for a batch of said input dataset at least in part by obtaining aggregation communication timing information for each of the node counts based on one or more communication timing measurements, wherein obtaining the aggregation communication timing information comprises calling an Allreduce function on different numbers of nodes and a buffer size equal to the model size and (ii) an average communication time, corresponding to communications between at least a portion of the plurality of nodes, for said batch of said input dataset, wherein the average communication time is based at least in part on the size of the model and the number of nodes corresponding to the given node count; and
   selecting, based at least in part on said estimating, at least one of said node counts for processing the job;
   wherein the method is carried out by at least one computing device.

2. The computer-implemented method of claim 1, wherein said estimating comprises estimating a cost to process the job using the number of nodes corresponding to the given node count.

3. The computer-implemented method of claim 2, wherein said estimating the cost is based at least in part on pricing information associated with using one or more of the plurality of nodes and the estimated execution time.

4. The computer-implemented method of claim 1, comprising:
   causing information to be output to a user interface, the information comprising the estimated execution time for each of the selected node counts, and
   in response to causing said information to be output, causing the job to be processed with one of said selected node counts based on user input received via the user interface.

5. The computer-implemented method of claim 1, wherein said selecting is based at least in part on one or more constraints provided by a user, wherein said one or more constraints comprises at least one of (i) a cost constraint and (ii) a time constraint.

6. The computer-implemented method of claim 5, wherein said selecting comprises selecting an optimal node count for the one or more user constraints.

7. The computer-implemented method of claim 6, comprising:
   causing the job to be processed with the optimal node count.

8. The computer-implemented method of claim 1, wherein said determining said average computation time for said batch of said input dataset comprises:
   determining an amount of time to process one or more batches of the input dataset using a single one of the plurality of nodes.

9. The computer-implemented method of claim 1, wherein said determining said average communication time comprises:
   interpolating the aggregation communication timing information for a first one of the node counts and a second one of the node counts to determine aggregation communication timing information for at least a third one of the node counts.

10. The computer-implemented method of claim 1, wherein the job comprises at least one of:
    a deep learning job for training a Neural Network;
    a higher order singular value decomposition job; and
    a history matching job in reservoir characterization.

11. The computer-implemented method of claim 1, wherein said obtaining comprises obtaining a batch size per node, and wherein said computing the plurality of node counts is based at least in part on said batch size per node.

12. A computer program product comprising a computer readable storage medium having program instructions embodied therewith, the program instructions executable by a computing device to cause the computing device to:

obtain (i) a size of a model, and (ii) a set of batch sizes for an input dataset corresponding to a job to be processed using a distributed computing system, wherein said distributed computing system comprises a plurality of nodes;

compute, based at least in part on the set of batch sizes, a plurality of node counts, each node count corresponding to a number of nodes that can be used for processing said job;

estimate, for each given one of said node counts, an execution time to process the job using the number of nodes corresponding to the given node count, wherein said estimating comprises determining (i) an average computation time for a batch of said input dataset at least in part by obtaining aggregation communication timing information for each of the node counts based on one or more communication timing measurements, wherein obtaining the aggregation communication timing information comprises calling an Allreduce function on different numbers of nodes and a buffer size equal to the model size and (ii) an average communication time, corresponding to communications between at least a portion of the plurality of nodes, for said batch of said input dataset, wherein the average communication time is based at least in part on the size of the model and the number of nodes corresponding to the given node count; and select, based at least in part on said estimating, at least one of said node counts for processing the job.

13. The computer program product of claim 12, wherein said estimating comprises estimating a cost to process the job using the number of nodes corresponding to the given node count.

14. The computer program product of claim 13, wherein said estimating the cost is based at least in part on pricing information associated with using one or more of the plurality of nodes and the estimated execution time.

15. The computer program product of claim 13, wherein said selecting is based at least in part on one or more constraints provided by a user, wherein said one or more constraints comprises at least one of (i) a cost constraint and (ii) a time constraint.

16. The computer program product of claim 15, wherein said selecting comprises selecting an optimal node count for the one or more user constraints.

17. The computer program product of claim 13, wherein said determining said average computation time for said batch of said input dataset comprises:

determining an amount of time to process one or more batches of the input dataset using a single one of the plurality of nodes.

18. The computer program product of claim 12, wherein the program instructions further cause the computing device to:

cause information to be output to a user interface comprising the estimated execution time for each of the selected node counts, and in response to causing said information to be output, cause the job to be processed with one of said selected node counts based on user input received via the user interface.

19. A system comprising:
a memory; and
at least one processor operably coupled to the memory and configured for:

obtaining (i) a size of a model and (ii) a set of batch sizes for an input dataset corresponding to a job to be processed using a distributed computing system, wherein said distributed computing system comprises a plurality of nodes;

computing, based at least in part on the set of batch sizes, a plurality of node counts, each node count corresponding to a number of nodes that can be used for processing said job;

estimating, for each given one of said node counts, an execution time to process the job using the number of nodes corresponding to the given node count, wherein said estimating comprises determining (i) an average computation time for a batch of said input dataset at least in part by obtaining aggregation communication timing information for each of the node counts based on one or more communication timing measurements, wherein obtaining the aggregation communication timing information comprises calling an Allreduce function on different numbers of nodes and a buffer size equal to the model size and (ii) an average communication time, corresponding to communications between at least a portion of the plurality of nodes, for said batch of said input dataset, wherein the average communication time is based at least in part on the size of the model and the number of nodes corresponding to the given node count; and selecting, based at least in part on said estimating, at least one of said node counts for processing the job.

20. A computer-implemented method comprising:

determining a plurality of computing resource configurations of a distributed computing system for processing a batch based job based at least in part on (i) a size of a model and (ii) a set of batch sizes for an input dataset corresponding to the batch based job;

determining, for each given one of said computing resource configurations, (i) an average computation time to process a batch of said input dataset using the given computing resource configuration at least in part by obtaining aggregation communication timing information for each of the node counts based on one or more communication timing measurements, wherein obtaining the aggregation communication timing information comprises calling an Allreduce function on different numbers of nodes and a buffer size equal to the model size and (ii) an average communication time, corresponding to communications between at least a portion of the plurality of nodes, for said batch of said input dataset; and selecting the optimal computing resource configuration for processing the batch based job from among the plurality of computing resource configurations, based at least in part on (i) the average computation time and (ii) the average communication time determined for each of the computing resource configurations;

wherein the method is carried out by at least one computing device.

* * * * *